W. B. CAMBRON.
DEVICE FOR SHAPING SCRAPERS.
APPLICATION FILED NOV. 3, 1908.
976,630.
Patented Nov. 22, 1910.
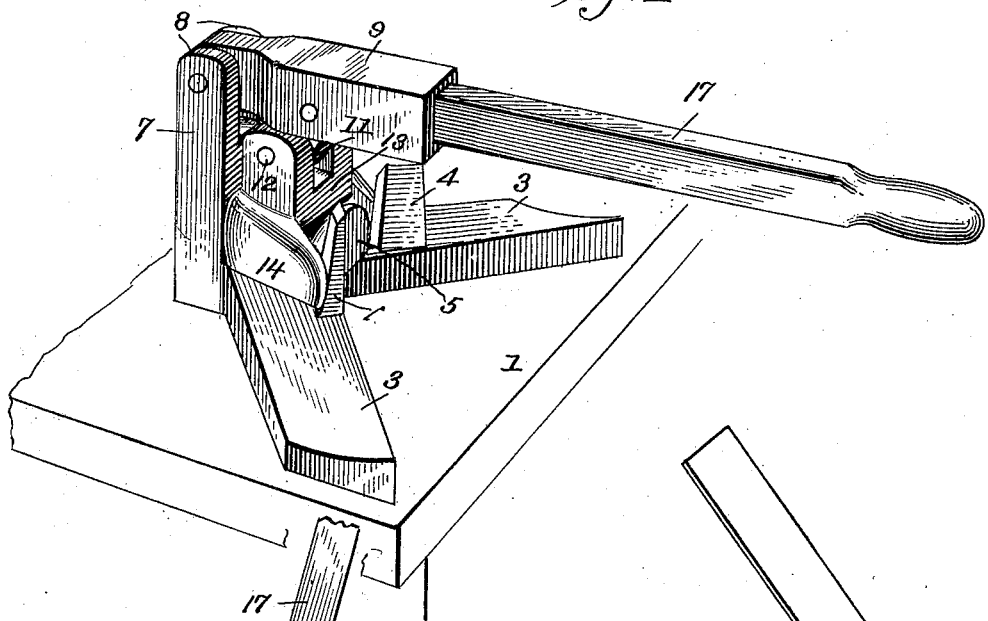
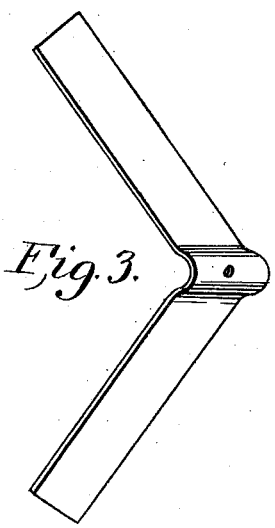
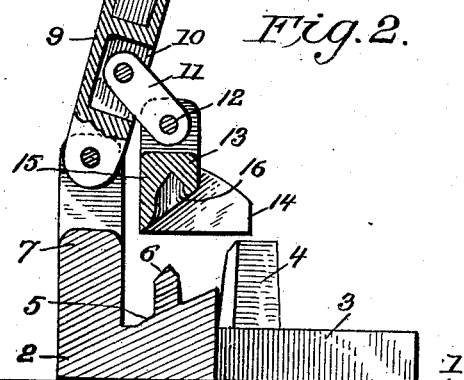
Witnesses
Jos. A. Ryan
Inventor
William B. Cambron
By Victor J. Evans
Attorney

UNITED STATES PATENT OFFICE.

WILLIAM B. CAMBRON, OF PIEDMONT, ALABAMA.

DEVICE FOR SHAPING SCRAPERS.

976,630. Specification of Letters Patent. Patented Nov. 22, 1910.

Application filed November 3, 1908. Serial No. 460,856.

*To all whom it may concern:*

Be it known that I, WILLIAM B. CAMBRON, a citizen of the United States, residing at Piedmont, in the county of Calhoun and State of Alabama, have invented new and useful Improvements in Devices for Shaping Scrapers, of which the following is a specification.

This invention relates to devices for shaping agricultural scrapers, and one of the principal objects of the same is to provide a hand-operable tool for shaping or setting earth scrapers for agricultural purposes, said device comprising a base having the required contour and a lever provided with a pivoted former.

Another object of the invention is to provide a hand tool which will quickly shape and set a land scraper blade and which will form a bolt hole therein for connecting the scraper to a standard.

Land scrapers after they have been used a certain length of time become bent, misshapen and dull. It is the purpose of my invention to take such scrapers and place them in position between the anvil and the lever for giving them the required set and shape.

These and other objects may be attained by means of the construction illustrated in the accompanying drawing, in which,—

Figure 1 is a perspective view of a tool or device made in accordance with my invention. Fig. 2 is a vertical sectional view, showing the lever thrown upward in position to place a scraper in position to be set. Fig. 3 is a perspective view of one of the scrapers for which my device is adapted to shape a seat.

Referring to the drawing, the numeral 1 designates a work stand upon which the device is adapted to be secured or upon which it is supported. The base 2 is provided with divergent anvil members 3, the upper surfaces of which are inclined at the required angle to form the undersurface of the scraper. Guides 4 extend upward from the anvil members 3, said guides being disposed at the inner edges and near the junction of the two members 3. An inclined surface 5 for shaping the point of the scraper is provided with an upwardly extending punch stud 6. Pivotally connected to an upwardly extending standard 7 provided with spaced arms 8 is a lever socket 9, said socket having a recess 10 in the underside thereof, and pivotally mounted in said recess is a link 11, the outer end of which is pivotally connected, as at 12, to a former block 13, said former block having oppositely disposed members 14 and a connecting cross bar 15, the latter being provided with a recess 16 for the punch stud 6. A lever handle 17 is detachably connected to the socket 9.

It will be obvious that by reason of the length of the link 11 and its particular pivotal connection with the former block 13 and in the lever socket 9, the said lever on downwardly depressing the same will contact with the former block so as to relieve the strain upon the link 11, thus transferring the strain from the lever directly to the former block.

The operation of my invention may be briefly described as follows: A bent or misshapen scraper blade may be placed upon the anvil member 3, and by bringing the lever 17 down the scraper is set and shaped to the required contour. New scraper blades may be readily formed on the device by placing the blanks in position and operating the lever 17 to press the blank into proper shape and to form a bolt hole therein near the point.

From the foregoing it will be obvious that my invention is of simple construction, can be manufactured at low cost, can be operated to quickly shape and set scraper blades, and is strong, durable and efficient for its purpose.

I claim:—

The herein described device, comprising a V-shaped base having upper concaved faces, an inclined block rising centrally from said base and having a vertically central punch stud, a standard on the said base and having a bifurcated upper end, a lever pivoted at one end to the said standard in the bifurcation, a former having forwardly diverging extensions spaced from each other, a link pivoted to the lever and former whereby on depressing the lever the latter will bear upon the former, the said former being provided with a recess correspondingly spaced to the said punch stud for receiving the same, and upstanding lugs spaced from each other on the said base and having
5 beveled inner faces engaged by the extensions for guiding the former to its seat in the base, substantially as described.

In testimony whereof I affix my signature in presence of two witnesses.

WILLIAM B. <sup>his</sup> ✕ CAMBRON.
<sub>mark</sub>

Witnesses:
  J. L. ADDERHOLD,
  E. S. FORMBY.